United States Patent

Gephardt et al.

[11] Patent Number: 5,901,332
[45] Date of Patent: May 4, 1999

[54] SYSTEM FOR DYNAMICALLY RECONFIGURING SUBBUSSES OF DATA BUS ACCORDING TO SYSTEM NEEDS BASED ON MONITORING EACH OF THE INFORMATION CHANNELS THAT MAKE UP DATA BUS

[75] Inventors: Douglas D. Gephardt; Brett B. Stewart; Rita M. Wisor, all of Austin; Steven L. Belt, Pflugerville; Drew J. Dutton, Austin, all of Tex.

[73] Assignee: Advanced Micro Devices Inc., Sunnyvale, Calif.

[21] Appl. No.: 08/921,078

[22] Filed: Aug. 29, 1997

Related U.S. Application Data

[63] Continuation-in-part of application No. 08/477,700, Jun. 7, 1995, abandoned.

[51] Int. Cl.[6] ................................................. G06F 13/40
[52] U.S. Cl. .......................... 395/861; 395/296; 395/307
[58] Field of Search .................................. 395/552, 861, 395/296, 307

[56] References Cited

U.S. PATENT DOCUMENTS

| | | | |
|---|---|---|---|
| 4,604,743 | 8/1986 | Alexandru | 370/85 |
| 4,635,192 | 1/1987 | Ceccon et al. | 395/382 |
| 4,855,730 | 8/1989 | Venners et al. | 340/825.24 |
| 4,933,845 | 6/1990 | Hayes | 364/200 |
| 5,276,679 | 1/1994 | McKay et al. | 370/358 |
| 5,369,418 | 11/1994 | Richards | 345/507 |
| 5,497,490 | 3/1996 | Harada et al. | 395/700 |
| 5,535,342 | 7/1996 | Taylor | 395/307 |
| 5,561,669 | 10/1996 | Lenney et al. | 370/352 |
| 5,598,542 | 1/1997 | Leung | 395/297 |
| 5,694,586 | 12/1997 | Eneboe | 395/552 |

FOREIGN PATENT DOCUMENTS

| | | |
|---|---|---|
| 433142 | 6/1991 | European Pat. Off. . |
| 62-208171 | 12/1987 | Japan . |
| 4245363 | 1/1992 | Japan . |

*Primary Examiner*—Thomas C. Lee
*Assistant Examiner*—David Ton
*Attorney, Agent, or Firm*—Foley & Lardner

[57] ABSTRACT

A data bus for connecting information processing devices is configurable into a plurality of subbusses in order to fully utilize the data bus capacity. The size and data transfer direction of each subbus, as well as the data transfer speed of each subbus, is independent of the other subbusses. Also, the data bus can be reconfigured to meet changing system requirements. A data bus controller is thus provided to accomplish this data bus reconfiguration. The reconfiguration may be accomplished in accordance with one of a plurality of information flow templates which may be stored in a memory. A method of configuring a data bus is also provided wherein information transfer needs of a system are identified and the data bus is configured according to the identified information transfer means. The reconfiguration in accordance with the information transfer needs may be accomplished in accordance with one or more information flow templates which may be stored in a memory. The system may operate in accordance with a self arbitration scheme such that reconfiguration of the system is based on operational experience, such as utilization rates or excess capacity associated with each of the subbusses.

19 Claims, 3 Drawing Sheets

SYSTEM FOR DYNAMICALLY RECONFIGURING SUBBUSSES OF DATA BUS ACCORDING TO SYSTEM NEEDS BASED ON MONITORING EACH OF THE INFORMATION CHANNELS THAT MAKE UP DATA BUS

This application is a continuation of application Ser. No. 08/477,700, filed Jun. 7, 1995, now abandoned.

BACKGROUND OF THE INVENTION

Present information systems with multiple devices having multiple information flows do not distinguish between types of data at a conceptual level. For example, distinctions between natural data types such as audio data and visual data are easily understood by humans, while such distinctions are not significant to machines. Machines typically transfer information in the form of bits and packets.

Transmission of information in the form of bits and packets is not aimed at achieving a particular end goal or result, but is only aimed at transferring information at a high speed. However, high speed transfer of information, even over a system with an extremely wide bandwidth, is not always helpful if a natural data flow fails to take place. From the architectural viewpoint of high level functions, it is desirable to develop an information transfer system in which buses and subbusses can be allocated to accommodate natural data flow as needed.

SUMMARY OF THE INVENTION

Therefore, an object of the invention is to provide a system in which buses can be reallocated dynamically to accommodate the requirements of natural data flow as needed. For example, a high performance path for transferring information from a processor to a display may require three information channels while a lower performance path, such as that required to transfer audio information, requires only one such information channel. Moreover, according to the invention it should be possible to operate different portions of such buses at different speeds, such that the speed of each bus portion can be optimized for each data transfer requirement. This may be accomplished using a self clocking bus or a bus which is clocked per subsection.

One example includes dividing a 64 bit bus into four 16 bit subbusses, or even 64 single bit buses. This division would allow dynamic bandwidth allocation based on the system information transfer needs, as those needs come and go in the system.

A multidirectional transfer system can also be applied according to the invention. In a conventional system, all data on the bus goes the same way at a particular time t. However, according to the invention, we can partition the bus such that data may simultaneously go in different directions and be transferred at different rates. Such an approach increases parallelism.

A significant issue in such a system according to the invention is command and control of the bus. One approach is to employ a self arbitration scheme among several processors or other data transfer devices. The self arbitration scheme can be implemented according to a series of rules stored in memory and executed by one or more processors in order to avoid excess complexity. For example, the rules may specify that bits or groups of bits demanded by a processor must be contiguous. Other rules as demanded by system needs or designer specification may also be implemented. One advantage of using a rule-based system is that rules can be changed to accommodate new requirements. Further, artificial intelligence concepts can be employed to adjust the rules as the system learns new data paths which optimize information transfer efficiency.

Another approach which could be used alone or in conjunction with a rule-based system is to configure the system so that low speed, low bandwidth devices are connected only to necessary portions of the bus rather than to the entire bus. For example, where a 64 bit bus is available, a low speed, low bandwidth device need not be connected to all 64 bits of the bus for information transfer. In this case, a smaller number of bits, for example four bits or eight bits can be used to transfer the information. The connection of the low speed, low bandwidth devices to a portion of the bus can be either a fixed connection or, more preferably, can be done dynamically through a series of switches whose connection states are controlled, for example, by software.

Most preferably, a predetermined set of configurations for a given system design can be generated to serve as templates. Such templates can be used for necessary system functions which serve as master pattern templates to meet system information transfer needs. Each template would include the information necessary to configure a system and its buses to accommodate information transfer needs anticipated for the system. For example, one template could be used to configure a bus such that a large portion of the bus transfers visual information while a smaller portion of the bus transfers audio information. Another template could be used to configure the bus to perform background processing while audio and visual transfer of information does not take place. Any number of such templates could be created and stored in the memory depending on the system needs. A processor operating as a template change controller would issue the necessary commands to change the template as system needs change.

BRIEF DESCRIPTION OF THE DRAWINGS

The objects of the invention will become more readily apparent from a review of the figures, wherein.

DETAILED DESCRIPTION

Figure 1:
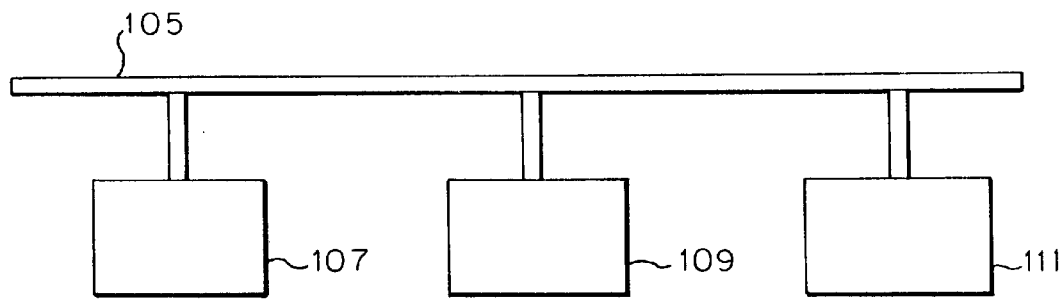
FIG. 1 shows a block diagram of a first embodiment of the invention.

FIG. 1 shows a first embodiment of the invention. Data bus 105 is connected between information processing devices 107 and 109. Data bus controller 111 is also connected to data bus 105. Data bus controller 111 may also be connected to devices 107 and 109, either directly, or via one information channel of data bus 105.

Data bus 105 contains a plurality of information channels which transfer information between devices such as devices 107 and 109. For example, data bus 105 may contain 64 parallel information channels. These information channels enable devices 107 and 109 to communicate up to 64 bits of parallel information to each other or to other devices connected to data bus 105.

Figure 2:
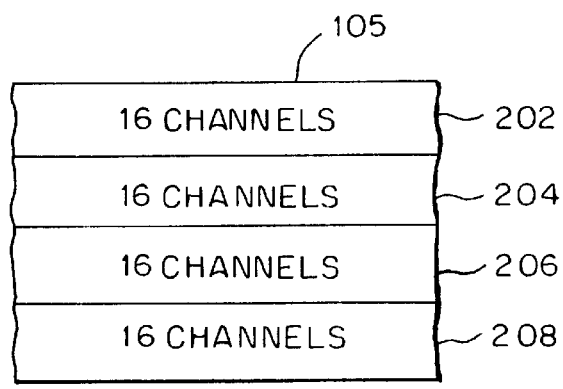
FIG. 2 shows one configuration of subbus 105 of FIG. 1.

Data bus controller 111 is connected to data bus 105 in order to affect the configuration of the information channels within data bus 105. FIG. 2 shows one configuration of data bus 105 wherein data bus 105 is configured into four 16-bit subbusses 202, 204, 206 and 208. In this configuration, each of the subbusses can transmit data on its information channels independently of the other subbusses. For example, subbus 202 can transfer data from device 107 to device 109 at the same time that subbus 204 is transferring data from device 109 to device 107.

Also, subbusses 206 and 208 can transfer data in parallel with the data transfers occurring on subbusses 202 and 204. These data transfers may be, for example, from device 107 to another device in the system (not shown) on subbus 206, and from the other device of the system to device 109 on subbus 208.

The data flow in the information channels of the subbusses is thus configured such that each of the information channels within a subbus transfers information from the same source device, and to the same target device, as the other information channels in that subbus. However, the source device, target device and information direction for the information channels of one subbus can be completely different from those of another subbus. Further, the subbusses can operate at varying speeds, such that the speed of data transfer between devices within one subbus can be different from the speed of data transfer within another subbus.

Figure 3:
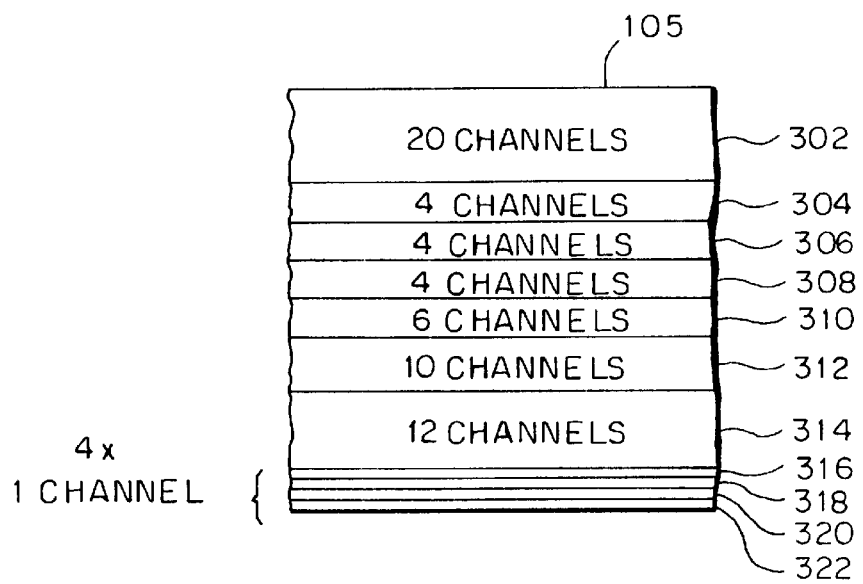
FIG. 3 shows another configuration of subbus 105 of FIG. 1.

In accordance with changing mission requirements, data bus controller 111 can reconfigure data bus 105 to a new configuration, such as that shown in FIG. 3. This configuration shows subbus 302 containing 20 information channels, subbusses 304, 306 and 308 each containing four information channels, subbus 310 containing six information channels, subbus 312 containing 10 information channels, subbus 314 containing 12 information channels, and subbusses 316, 318, 320 and 322 each containing one information channel.

A comparison between FIGS. 2 and 3 shows that subbus 302 comprises the 16 information channels of subbus 202 as well as four information channels from subbus 204. Similarly, the other subbusses of FIG. 3 comprise information channels which were organized in a different configuration in the subbus structure of FIG. 2. Therefore, as bus 105 is dynamically reconfigured, a given information channel can change from being associated with one subbus to being associated with another subbus. Also, as shown in FIG. 3, a given information channel may become a subbus on its own, as is the case for subbusses 316, 318, 320 and 322.

Figure 4:
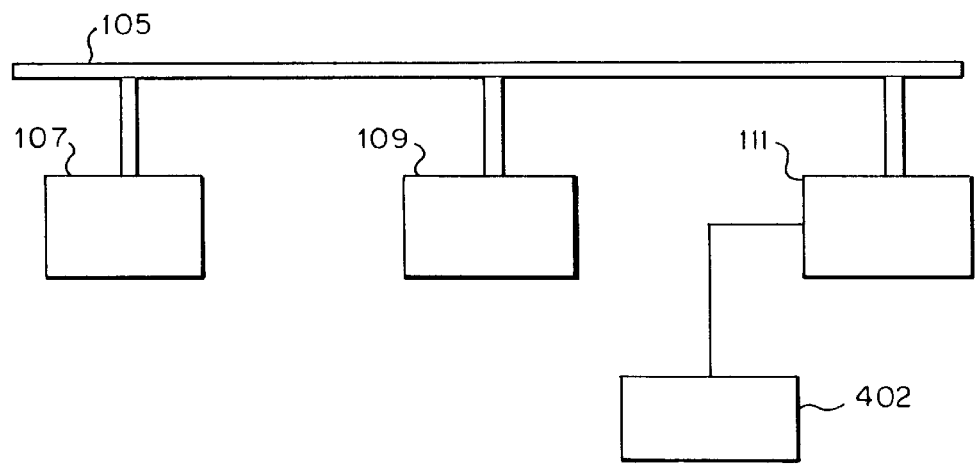
FIG. 4 shows a block diagram of a second embodiment of the invention.

FIG. 4 shows an alternative embodiment of the invention wherein memory 402 is connected to bus controller 111. Memory 402 may also be connected to devices 107 and 109, either directly, or via bus controller 111 and one or more of the information channels of data bus 105. Memory 402 can hold one or more information flow templates which can be supplied to bus controller 111. These templates can provide bus controller 111 with configuration data for affecting a transition between a first configuration, such as that of FIG. 2, and a second configuration, such as that of FIG. 3.

For example, data bus controller 111, which itself could include a memory and a processor or execution unit, can be commanded by a central processing unit (not shown) to change the configuration of data bus 105. The central processing unit can also tell data bus controller 111 which configuration to adopt, by, for example, providing an identifying designation of a template contained in memory 402. Data bus controller 111 can then retrieve the designated template from memory 402 and reconfigure data bus 105 in accordance therewith.

Alternatively, a device such as device 107 or device 109 could request a reconfiguration of data bus 105 from bus controller 111. For example, if device 109 is communicating with bus controller 111 via one of the subbusses of data bus 105, while simultaneously communicating with device 107 via another subbus of data bus 105, device 109 may recognize an upcoming need to transfer a large quantity of data to device 107. In this case, the subbus currently allocated for device 109 to communicate to device 107 is determined by device 109 to be inadequate. Based on this determination, device 109 can request a larger subbus for communication to device 107 from bus controller 111. In response to this request, bus controller 111 can allocate a larger subbus, meaning a larger number of information channels, of data bus 105 for device 109 to communicate to device 107.

Such allocation can be accomplished by controller 111 by response to device 109's request for bus capacity in terms of a specific number of bits. Alternatively, device 109 could signal bus controller 111 of a need to execute a particular type of data transfer and device 111 could allocate the appropriate bus resources based on device 111's knowledge of the transfer requirement, available resources and system rules. For example, device 111 may allocate one set of bus resources to transmit stationary background video and different resources to transmit a moving graphic. Further, depending on other system demands, the system rules may direct controller 111 to allocate different resources for the same type of transfer at different times.

The request from device 109 to bus controller 111 can, for example, specify that a desired number of information channels be allocated for communicating with device 107. In another alternative according to the invention, the request can identify a desired configuration by way of providing an information flow template designation to bus controller 111, wherein the template so designated allocates a subbus with the desired number of information channels for communicating from device 109 to device 107. In response, bus controller 111 can then retrieve the designated information flow template from memory 402 and reconfigure bus 105 in accordance therewith.

Figure 5:
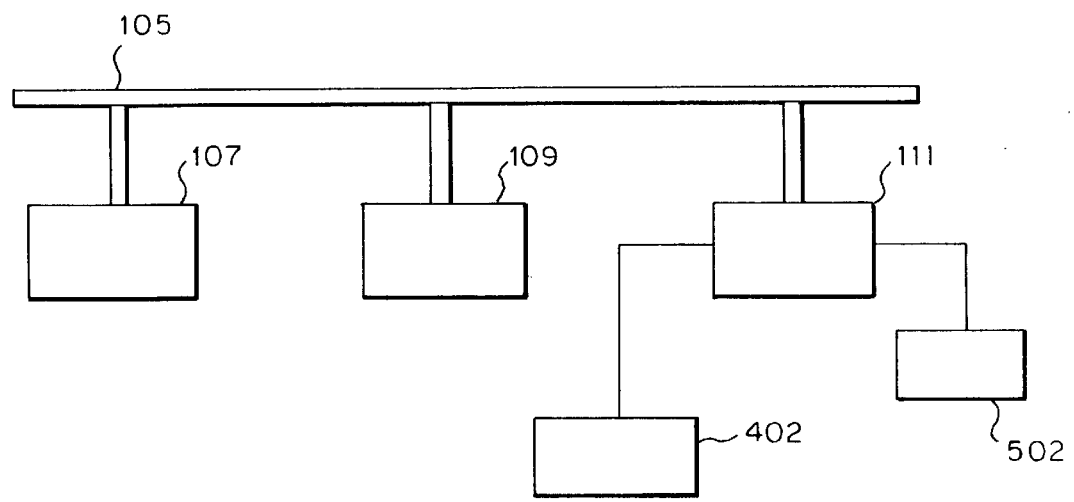
FIG. 5 shows a block diagram of a third embodiment of the invention.

As described above, bus controller 111 retrieves the information flow templates from memory 402 in response to either a central processing unit or a request from one of the devices. Bus controller 111 thus also acts as a template change controller. Alternatively, a separate template change controller 502, as shown in the embodiment of FIG. 5, can be provided to instruct data bus controller 111 to retrieve specific information flow templates from memory 402. Alternatively, template change controller 502 can be connected to memory 402, such that template change controller 502 instructs memory 402 to supply specific templates to bus controller 111.

Thus, bus controller 111 can reconfigure data bus 105 in accordance with a request from a central processing unit, a template change controller, or any of the devices connected to data bus 105. In addition, other devices can provide information transfer needs to bus controller 111, wherein bus controller 111 can then determine the appropriate configuration of data bus 105 required to meet the information transfer needs and then reconfigure data bus 105 in accordance with this configuration. Thus, each of the aforementioned devices connected to bus controller 111 can be viewed as an information transfer needs input device.

In addition, a user, or other system connected either directly or remotely to data bus 105, can also input information transfer needs to bus controller 111. Bus controller 111 can either reconfigure data bus 105 based on its own analysis of the information transfer needs, or can select one of the information flow templates from memory 402 and reconfigure data bus 105 according to the selected information flow template.

As the system continues to operate, bus controller 111 can continue to reconfigure data bus 105. This reconfiguration can be done on an as needed basis, such as in response to a request from one of the devices or an instruction from the central processing unit. Alternatively, this reconfiguration can be done on a regular basis in accordance with a reconfiguration scheme. For example, bus controller 111 can periodically poll the information channels of the subbusses contained in data bus 105 to determine the excess capacity of each of the subbusses. If some of the subbusses are near capacity, while other subbusses have excess capacity, bus controller 111 can reconfigure data bus 105 to take information channels away from the subbusses with excess capacity and supply these information channels to the subbusses which are near capacity.

Alternatively, the devices connected to data bus 105 can monitor the activity within the subbusses through which they communicate and provide this information to bus controller 111. In this manner, the system can reconfigure itself in accordance with a self arbitration scheme, such that optimal use is made of the capacity of data bus 105. The self arbitration scheme can comprise a set of rules which control the activity of bus controller 111 in reconfiguring data bus 105. For example, the rules can require that groups of information channels connected between two devices must be contiguous within data bus 105. The embodiments shown in FIGS. 2 and 3 follow this rule, wherein each of the information channels within a subbus is contiguous with the other information channels in that subbus. This rule is presented merely by way of illustration and not limitation. Clearly, an alternative configuration can be established wherein a subbus comprises information channels which are discontinuous. Further, the rules of the self arbitration scheme can be updated periodically to reflect operational experience of the system.

Figure 6:
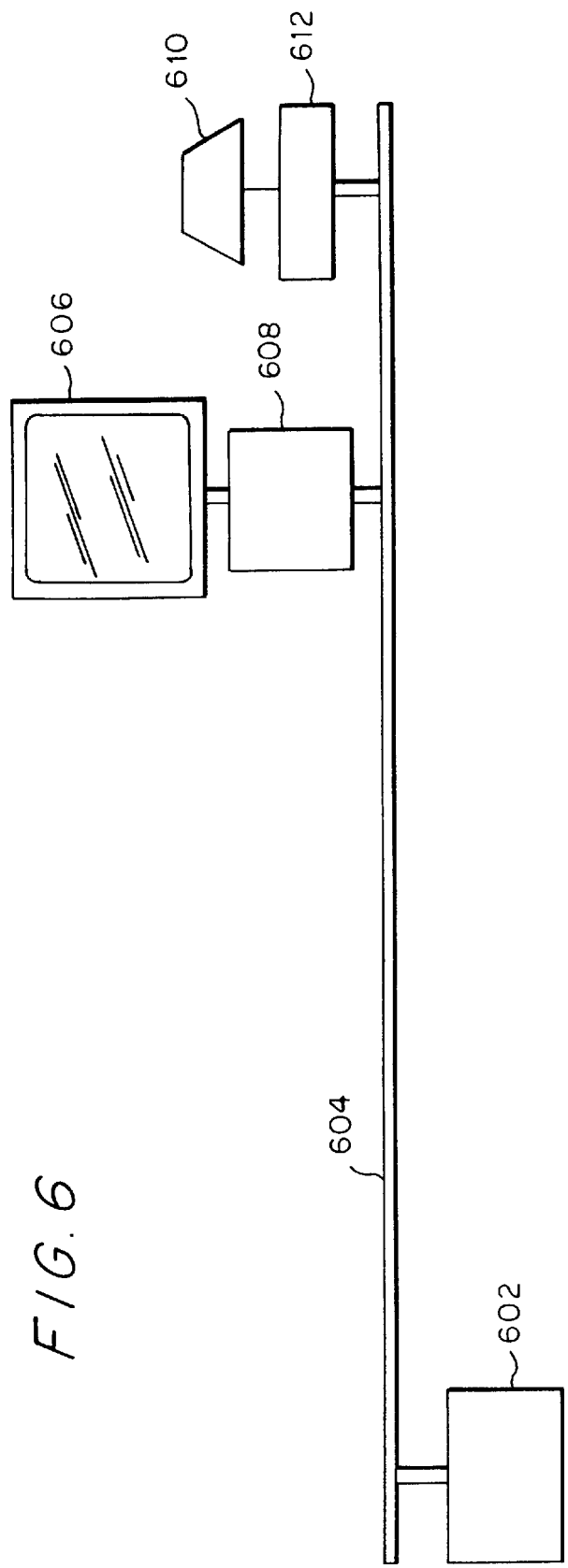
FIG. 6 shows a block diagram of a system application of the invention.

FIG. 6 shows a simple example of a data bus as described herein. Data processing unit 602 is connected to data bus 604. Also connected to data bus 604 is video monitor 606 via video processor 608. Similarly, speaker 610 is connected to data bus 604 via audio processor 612. In operation, data processor 602 sends digital information to video processor 608 and audio processor 612 over data bus 604. In a conventional system, the information channels of data bus 604 would be shared in a time sequential multiplexed manner such that at a given time data processor 602 would be sending digital information to either video processor 608 or audio processor 612. Hand-shaking and other control information must also be sent back to data processor 602 from video processor 608 and audio processor 612. These return signals would also be sent over data bus 604 by time sequential multiplexing. Thus, at a certain time, the only data transfer along data bus 604 would be from video processor 608 to data processor 602.

By reconfiguring data bus 604 in accordance with the invention, subbusses can be established within data bus 604. Thus, one subbus can provide data from data processor 602 to video processor 608, while another subbus provides data from data processor 602 to audio processor 612. Additional subbusses can be provided for the transmission of hand-shaking and control data from video processor 608 and audio processor 612 to data processor 602. For example, presume data bus 604 has 64 parallel information channels. Since video processing is very data intensive, a large number of these data channels, for example 48 data channels, can be allocated to a first subbus for transfer of data from data processor 602 to video processor 608. Video processor 608 then processes the information received over the first subbus to provide a video display on monitor 606.

Since audio output is less data intensive, a second and smaller subbus within data bus 604 can be provided for the transfer of data from data processor 602 to audio processor 612. This second subbus can be, for example, 10 information channels. Similarly, third and fourth subbusses can be established to provide, for example, four information channels from video processor 608 to data processor 602 and two information channels from audio processor 612 to data processor 602.

In accordance with the invention, as system needs change, the configuration of bus 604 can be updated to best utilize the capacity therein. Thus, a data bus can be reconfigured into a plurality of subbusses in order to meet system needs.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A data information transfer system comprising:
    a first information processing device;
    a second information processing device;
    a data bus having a plurality of information channels between said first and second information processing devices;
    a data bus controller connected to configure said data bus into one of a plurality of configurations to transfer information between said first and second information processing devices at different times or at the same time according to dynamically changing system information transfer needs;
    wherein each of the plurality of information channels is monitored by at least one of the first information processing device, the second information processing device, and the data bus controller, so as to determine the dynamically changing system information transfer needs.

2. The apparatus recited in claim 1, further comprising a memory storing a plurality of information flow templates, each said information flow template representing a predetermined configuration of said data bus; and
    a template change controller responsive to the dynamically changing system information transfer needs to retrieve an appropriate information flow template of the plurality of information flow templates, wherein said bus controller configures said data bus according to said retrieved template.

3. The data information transfer system recited in claim 1, further comprising:
    a third information processing device;
    wherein the data bus includes a plurality of information channels for providing data transfer among any two of said first, second and third information processing devices;

wherein said first information processing device is a data processor, said second information processing device is a video processor, and said third information processing device is an audio processor; and wherein a first subset of said plurality of information channels are provided for transfer of video data from said first information processing device to said second information processing device, a second subset of said plurality of information channels are provided for transfer of audio data from said first information processing device to said third information processing device, the video data being capable of being sent over said data bus at a same time the audio data is being sent over said data bus; and wherein the first and second subsets are mutually exclusive and are capable of dynamically changing over time.

4. The data information transfer system recited in claim 3, wherein a third subset of said plurality of information channels are provided for transmission of first control data between said first and third information processing devices; and wherein a fourth subset of said plurality of information channels are provided for transmission of second control data between said first and second information processing devices;

wherein the first, second, third and fourth subsets are mutually exclusive and are capable of dynamically changing over time.

5. A data bus comprising:

a first subbus including at least one information channel; and a second subbus including at least one information channel;

a memory storing a plurality of information flow templates;

a data bus controller connected to the memory and the data bus, the data bus controller configuring the first and second subbusses in accordance with at least one of the information flow templates; and an information transfer needs input device connected to the data bus controller, the information transfer needs input device dynamically supplying information transfer needs to the data bus controller such that the data bus controller selects the at least one of the information flow templates from the memory in accordance with the information transfer needs;

wherein the information channels of the first and second subbusses are configurable such that information in the at least one data channel of the first subbus is flowing independently of information in the at least one data channel of the second subbus; and wherein the information transfer needs input device determines the information transfer needs based on a periodic polling of each of the information channels of the first and second subbusses.

6. The data bus recited in claim 5, wherein the information in the at least one information channel of the first subbus is flowing at a first speed and the information in the at least one information channel of the second subbus is flowing at a second speed which is different from the first speed.

7. The data bus recited in claim 6, wherein the information in the at least one information channel of the first subbus is flowing in a first direction and the information in the at least one information channel of the second subbus is flowing in a second direction which is different from the first direction.

8. The data bus recited in claim 6, wherein the information in the at least one information channel of the first subbus is flowing between a first set of devices and the information in the at least one information channel of the second subbus is flowing between a second set of devices, at least one device in the second set of devices being different from the devices in the first set of devices.

9. The data bus recited in claim 7, wherein the information in the at least one information channel of the first subbus is flowing between a first set of devices and the information in the at least one information channel of the second subbus is flowing between a second set of devices, at least one device in the second set of devices being different from the devices in the first set of devices.

10. The data bus recited in claim 5, wherein the information in the at least one information channel of the first subbus is flowing in a first direction and the information in the at least one information channel of the second subbus is flowing in a second direction which is different from the first direction.

11. The data bus recited in claim 5, wherein the information in the at least one information channel of the first subbus is flowing between a first set of devices and the information in the at least one information channel of the second subbus is flowing between a second set of devices, at least one device in the second set of devices being different from the devices in the first set of devices.

12. The data bus recited in claim 5, wherein the first and second subbusses are configurable in accordance with at least one of a plurality of information flow templates.

13. The data bus recited in claim 5, wherein the information transfer needs input device is configured to receive a signal from at least one other device connected to the data bus, the signal corresponding to a request for transfer of a particular number of bits of data simultaneously over the data bus.

14. The data bus recited in claim 5, wherein the information transfer needs input device is configured to receive a signal from at least one other device connected to the data bus, the signal corresponding to a request for a particular type of data transfer over the data bus.

15. A method of configuring a data bus within a system, comprising the steps of:

dynamically identifying information transfer needs of the system;

selecting at least one information flow template from a memory to meet the information transfer needs;

configuring subbusses of the data bus to transfer information in accordance with the at least one information flow template, wherein each of the subbusses includes at least one communications channel of the data bus, each communication channel being assigned to one and only one of the subbusses at any particular time; and periodically monitoring each of the subbusses for amount of usage thereof, so as to determine the dynamically changing system information transfer needs.

16. A method as recited in claim 15, further comprising the step of periodically reconfiguring the subbusses in accordance with the at least one information flow template.

17. A method as recited in claim 16, wherein a self arbitration scheme is followed during the reconfiguring step, rules of the self arbitration scheme being stored in the memory and retrieved during the reconfiguring step.

18. A method as recited in claim 17, wherein one of the rules specifies that groups of information channels demanded by a device connected to the bus must be contiguous.

19. A method as recited in claim 17, further comprising the steps of updating the rules based on operational experience and storing the updated rules in the memory as part of an updated self arbitration scheme, the updated rules of the updated self arbitration scheme being thereafter retrieved as the rules during subsequent reconfiguring steps.

* * * * *